United States Patent
Fleury et al.

(10) Patent No.: US 8,661,114 B2
(45) Date of Patent: Feb. 25, 2014

(54) SERVICE DISCOVERY AGGREGATION METHOD IN A LOCAL AREA NETWORK AND DEVICE IMPLEMENTING THE METHOD

(75) Inventors: Jean-François Fleury, Beijing (CN); Jean-Baptiste Henry, Melesse (CN); Mary-Luc Champel, Marpire (FR)

(73) Assignee: Thomson Licensing, Issy les Moulineaux (FR)

( * ) Notice: Subject to any disclaimer, the term of this patent is extended or adjusted under 35 U.S.C. 154(b) by 729 days.

(21) Appl. No.: 11/791,292

(22) PCT Filed: Dec. 9, 2005

(86) PCT No.: PCT/EP2005/056657
§ 371 (c)(1),
(2), (4) Date: Jan. 14, 2008

(87) PCT Pub. No.: WO2006/061434
PCT Pub. Date: Jun. 15, 2006

(65) Prior Publication Data
US 2008/0256232 A1    Oct. 16, 2008

(30) Foreign Application Priority Data
Dec. 9, 2004  (FR) ...................... 01 43157

(51) Int. Cl.
*G06F 15/173* (2006.01)
*G06F 15/16* (2006.01)
*H04L 29/08* (2006.01)
*H04L 29/06* (2006.01)

(52) U.S. Cl.
CPC .......... *H04L 29/08072* (2013.01); *H04L 29/06* (2013.01)

USPC ................ 709/224; 79/223; 79/225; 79/203; 79/217; 79/219

(58) Field of Classification Search
USPC .......... 709/203, 223–225, 217, 219; 703/223, 703/227; 370/254
See application file for complete search history.

(56) References Cited

U.S. PATENT DOCUMENTS 6,834,298 B1 * 12/2004 Singer et al. ................. 709/220
7,266,582 B2 *  9/2007 Stelting ......................... 709/201
(Continued)

FOREIGN PATENT DOCUMENTS

JP    2003208366 A    7/2003
JP    2004310194 A    11/2004
(Continued)

OTHER PUBLICATIONS

Sergio Marti and Venky Krishnan, "Carmen: a dynamic service discovery architecture", HP Labaoratories, 2002, pp. 1-18.*

(Continued)

*Primary Examiner* — Catherine Thiaw
(74) *Attorney, Agent, or Firm* — Robert D. Shedd; Jeffrey M. Navon

(57) ABSTRACT

The invention enables a standard client according to the DVB-IPI phase 1 standard and connected within a local area network interconnected with a service delivery network via a non-transparent gateway to discover all the services offered to it both by the external delivery network an d by the servers in its local area network. The invention is based mainly on a service discovery aggregation functionality that we call "SD & S proxy" implemented on any one of the devices connected to the local area network running jointly with an ad-hoc configuration of the gateway.

6 Claims, 3 Drawing Sheets

(56) References Cited

U.S. PATENT DOCUMENTS

| | | | |
|---|---|---|---|
| 8,001,570 B2* | 8/2011 | Gardes et al. | 725/51 |
| 2001/0033554 A1 | 10/2001 | Ayyagari et al. | |
| 2002/0184370 A1* | 12/2002 | Simpson et al. | 709/227 |
| 2003/0140119 A1* | 7/2003 | Acharya et al. | 709/219 |
| 2003/0191802 A1* | 10/2003 | Zhao et al. | 709/203 |
| 2004/0030777 A1* | 2/2004 | Reedy et al. | 709/224 |
| 2004/0098506 A1* | 5/2004 | Jean | 709/245 |
| 2004/0111525 A1* | 6/2004 | Berkland et al. | 709/231 |
| 2004/0139151 A1* | 7/2004 | Flurry et al. | 709/203 |
| 2004/0205153 A1* | 10/2004 | Weisshaar et al. | 709/217 |
| 2005/0021725 A1* | 1/2005 | Lobbert | 709/223 |
| 2005/0038904 A1* | 2/2005 | Dougall | 709/236 |
| 2005/0076142 A1* | 4/2005 | Chin | 709/245 |
| 2005/0078644 A1* | 4/2005 | Tsai et al. | 370/338 |
| 2005/0125560 A1* | 6/2005 | Brockway et al. | 709/249 |
| 2005/0160172 A1* | 7/2005 | Eytchison | 709/227 |
| 2005/0198188 A1* | 9/2005 | Hickman | 709/217 |
| 2005/0198206 A1* | 9/2005 | Miller et al. | 709/219 |
| 2005/0267978 A1* | 12/2005 | Satapati | 709/230 |
| 2006/0004764 A1* | 1/2006 | Kurhekar et al. | 707/10 |
| 2006/0031459 A1* | 2/2006 | Ahn et al. | 709/224 |
| 2006/0156362 A1* | 7/2006 | Perrot | 725/110 |
| 2006/0168264 A1* | 7/2006 | Baba et al. | 709/230 |
| 2006/0230158 A1* | 10/2006 | Fukazawa et al. | 709/228 |
| 2006/0253560 A1* | 11/2006 | Aaltonen | 709/223 |
| 2007/0220574 A1* | 9/2007 | Schaefer et al. | 725/118 |
| 2008/0267152 A1* | 10/2008 | Alnas et al. | 370/338 |
| 2009/0175250 A1* | 7/2009 | Mathur et al. | 370/338 |

FOREIGN PATENT DOCUMENTS

| | | |
|---|---|---|
| JP | 2004343420 A | 12/2004 |
| WO | 2004057874 A1 | 7/2004 |

OTHER PUBLICATIONS

Choonhwa Lee and Sumi Helal: "Context Attributes: an approach to enable context-awareness for service discovery", Proceedings of the Symposium on Applications and the Internet (SAINT'03), 2003, 9 pages.*

Steven E. Czerwinski, Ben Y. Zhao, Todd D. Hodes, Anthony D. Joseph and Randy H. Katz: "An architecture for a secure Service Discovery Service", Mobicon'99, ACM, 1999, pp. 24-35.*

Stuart Cheshire Apple Computer et al: "DNS-Based Service Discovery"; IETF Standard-Working-Draft, Internet Engineering Task Force, No. 1, Jun. 20, 2003.

P. Stallard; T. Paila: "DVB thoughts on Service Discovery and Selection draft-stallard-mmusic-dvb-thoughts-on-sds-00.text", Internet Draft, Feb. 10, 2003, pp. 1-12.

Search Report Dated Feb. 6, 2006.

* cited by examiner

SERVICE DISCOVERY AGGREGATION METHOD IN A LOCAL AREA NETWORK AND DEVICE IMPLEMENTING THE METHOD

This application claims the benefit, under 35 U.S.C. §365 of International Application PCT/EP2005/056657, filed Dec. 9, 2005, which was published in accordance with PCT Article 21(2) on Jun. 15, 2006 in English and which claims the benefit of French patent application No. 0413157, filed Dec. 9, 2004

FIELD OF INVENTION

The present invention relates to the delivery of digital services over an IP network to a local client and more particularly, the phase for discovering the services offered to a client connected to a service delivery network via a local area or home network.

TECHNICAL BACKGROUND

The transmission of digital services, and more particularly of audio-visual services, over an IP network is the subject of standardization work within the DVB ("Digital Video Broadcasting") group. The result of this work can be found in the document "ETSI TS 102 034 v1.1.1 (2004-06) Digital Video Broadcasting (DVB); Transport of MPEG-2 Based DVB Services over IP Based Networks". This document should be considered, in the current phase, in the context of a client, called HNED ("Home Network End Device") in the standard, directly connected to the service delivery network via a transparent gateway as shown in FIG. 1. In this diagram, the client therefore belongs to the delivery network and shares its IP addressing space and the domain name, among other things.

Among other things, this standard describes the discovery of services in such a network. It defines the mechanisms used to discover the services, select a service and issue service discovery information.

The first problem addressed is the mechanism used to identify the service providers and the services. A service provider is identified uniquely by the domain name under which he is registered and which he controls.

The various steps in the discovery process are as follows. Firstly, the service information entry points must be determined. Such an entry point corresponds to an IP address of a server providing access to information describing services offered. This description information is described in the form of XML files describing the list of services and, for each service, giving certain information including the address to which this service is transmitted.

The first problem solved by the standard is therefore the way in which the service discovery entry point or points are found. The standard defines a process for finding this or these entry points consisting in 5 different methods offered to the client. The client has to try these 5 methods in turn and stop at the first one giving it at least one valid entry point to the service discovery.

This standard should be considered in the context in which the client is connected transparently to the transmission network. The client is a member of this network. This requirement is strict, because it is commonplace to have a digital service client in fact connected to a local area network which can be a home network or an enterprise network. Normally, in this case, the local area network is connected externally to an external network, such as the service delivery network, via a non-transparent gateway. The local area network has its own addressing space different from the transmission network, known address translation mechanisms being implemented on this gateway.

SUMMARY OF THE INVENTION

The invention should be considered in the context of a client connected to such a local area network different from the delivery network. To this local area network, for example home, can be connected other clients and also devices which will behave as digital service servers. One example that can be given is a gateway for connecting to audio-visual services transmitted by a satellite or cable and retransmitting them in the form of DVB services over the IP network. Another example that can be mentioned is a local media server containing stored services that can be transmitted over the local area network. Any kind of device behaving as DVB service servers on the IP network can thus be connected to the local area network.

The problem of the phase for discovering services offered to a client connected to such a network then arises. A client according to the standard described above will discover only the services offered by the external network. It will not be able to discover the services offered by servers local to its network.

The invention enables a standard client according to the DVB-IPI phase 1 standard and connected within a local area network interconnected with a service delivery network via a non-transparent gateway, to discover all the services offered to it both by the external delivery network and by the servers in its local area network. The invention is based mainly on a service discovery aggregation functionality that we call "SD&S proxy" implemented on any one of the devices connected to the local area network running jointly with an ad-hoc configuration of the gateway.

The invention relates to a method of providing information on digital services offered to the clients of a local area network, said local area network being connected to a digital service delivery network via a gateway, comprising the following steps:
  an internal discovery step of the servers offering digital services within the local area network;
  an external discovery step of the servers offering services on the delivery network;
  a step for aggregating the information collected in the internal and external discovery steps;
  a step for providing this information on the local area network.

According to a particular embodiment of the invention, the internal discovery step is carried out according to a standard discovery protocol of the devices within a local area network.

According to a particular embodiment of the invention, the standard discovery protocol of the devices within a local area network is UPnP.

According to a particular embodiment of the invention, the internal discovery step is carried out by manually configuring the addresses of said servers.

According to a particular embodiment of the invention, the external discovery and/or provision steps are carried out according to the DVB-IPI phase 1 standard.

The invention also relates to a device intended at least to provide information on digital services offered to the clients of a local area network connectable to said local area network, said local area network being connected to a digital service delivery network via a gateway, and having
  means of internal discovery of the servers offering digital services within the local area network;

means of external discovery of the servers offering services on the delivery network;

means of aggregating the information collected in the internal and external discovery steps; and means of providing this information on the local area network.

The invention also relates to a system for providing information on digital services offered to the clients of a local area network, said local area network being connected to a digital service delivery network via a gateway, in which said gateway is adapted to respond to requests aimed at obtaining the address of a server providing information on digital services.

According to a particular embodiment of the invention, the provisioning device and the gateway are one and the same device.

LIST OF FIGURES

The invention will be better understood, and other features and advantages will become apparent, from reading the description that follows, the description referring to the appended drawings in which.

DETAILED DESCRIPTION OF THE INVENTION

The document "ETSI TS 102 034 v1.1.1 (2004-06) Digital Video Broadcasting (DVB); Transport of MPEG-2 Based DVB Services over IP Based Networks" provides a first set of standardized specifications for the deployment of the first DVB services over bidirectional IP networks.

In this document, we will use the terms:

Content provider, to mean an entity that owns or is licensed to sell content.

Service provider, to mean an entity which acquires or licences content from a content provider and which packages this content in the form of services.

Delivery network, to mean the network connecting the service providers to the gateway of the delivery network.

Delivery network gateway, or more simply gateway, to mean the device which connects one or more delivery networks to one or more home network segments.

DVB-IP service, to mean a DVB service delivered over an IP network or content on-demand over IP.

DVB service, to mean a service defined by DVB as a sequence of programs controlled by a broadcaster which can be transmitted within a programming schedule.

Content on-demand, to mean a program supplied at the request of an end user for immediate consumption or storage.

Client or HNED (Home Network End Device), to mean a device connected to a home network and which terminates the IP-based information stream.

Home network segment, to mean a layered technology on a single link and which provides a layer 2 connection between HNED and connecting components.

Connecting component, to mean a component used to interconnect components at the link layer level.

Figure 1:
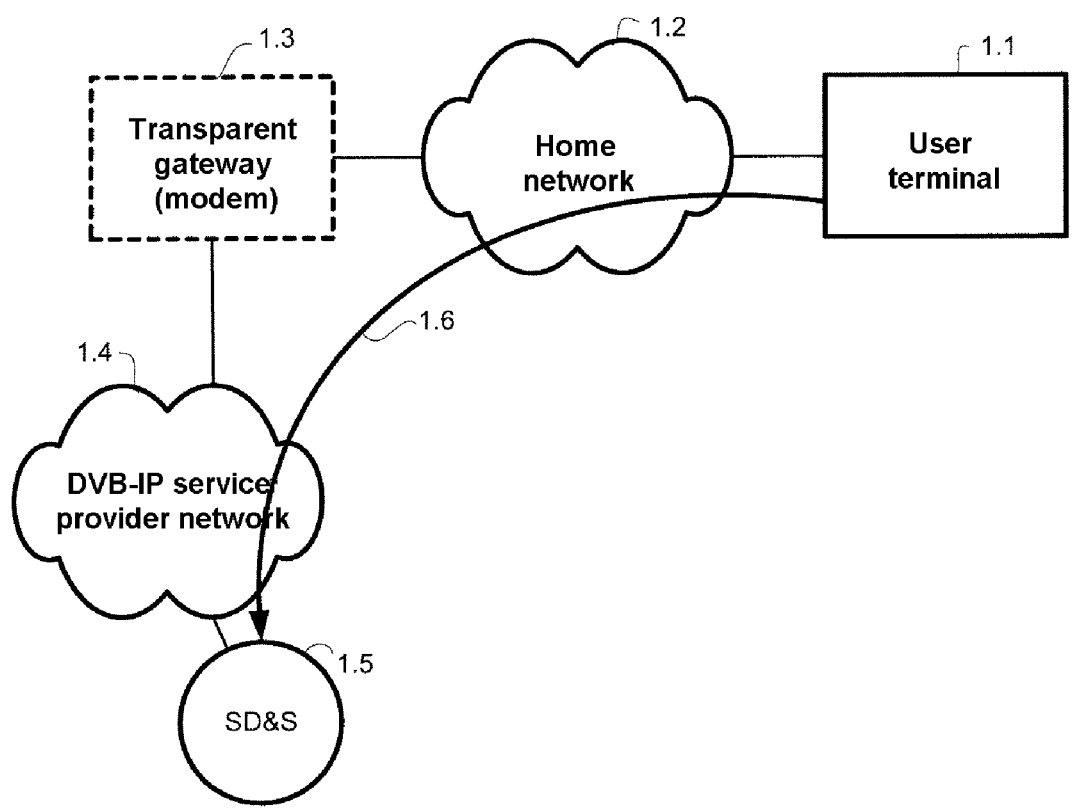
FIG. 1 represents the network architecture addressed by the current standard.

FIG. 1 represents the network architecture as addressed by the current standard. It shows an HNED, referenced 1.1, connected to a home network, referenced 1.2. The home network is connected to a delivery network, referenced 1.4, via a gateway, referenced 1.3. The delivery network hosts servers capable of providing DVB-IP services. The offering of services available within the delivery network is available in the form of an SD&S ("Service Discovery and Selection") server, referenced 1.5. This server, its operation and the form of the service information that it provides, are described in the abovementioned DVB-IPI document. This document provides the description in XML ("extensible Markup Language") file form of the information describing the services. These files can be accessed by HTTP ("HyperText Transfer Protocol") requests. The gateway 1.3 has the characteristic of being transparent, that is, it does not represent the boundary between two different networks. In particular, it does not implement address translation. The devices of the home network or local area network 1.2 such as the HNED client 1.1 are therefore in the addressing space of the delivery network 1.4. Provision is made in particular for the client, on connecting to the network, to obtain its IP address and the network configuration information via the well known DHCP ("Dynamic Host Configuration Protocol") protocol. For the connecting client, this protocol consists in transmitting its MAC address in the form of a broadcast request at the MAC layer level; this request will be recognized by a DHCP server which in return will provide it with the IP address that it needs to take and a number of network parameters such as the addresses of any gateways, the network mask and others. Provision is therefore made for the delivery network to host such a DHCP server, enabling configuration when clients connect. The arrow referenced 1.6 represents the entry point of the client's SD&S service pointing to the SD&S server 1.5.

The client, once connected and configured, needs to be able to find the entry point for the service discovery and selection (SD&S) service. This entry point is therefore the address of the SD&S server hosted by the delivery network. The process that a client must implement according to the standard to find this entry point is made up of 5 different methods enabling the client to find this entry point. These 5 methods must be tried in turn, in order, the process stopping when one of these methods enables the client to find at least one SD&S service entry point.

The first of these methods consists in using the optional mechanism described in the network provisioning information document. This mechanism consists in defining HTTP GET and POST requests, enabling the client to exchange standardized information with the network. When it is implemented, the client that starts up by using the DHCP ("Dynamic Host Configuration Protocol") protocol obtains, via the "siaddr" parameter of this protocol used to define the address of the next server, the address to be used for the HTTP requests. The client can therefore use an HTTP GET request to obtain a configuration file that can contain the entry points that are sought. If this network provisioning is not implemented, it being an optional mechanism of the standard, the DHCP "siaddr" field must be set to 0 when the client starts up.

The second method consists in using the domain name of the network. This domain name is obtained on startup by DHCP. The client concatenates the service name "_dvb-servdsc", the protocol name "_tcp" or "_udp" with this domain name to obtain the address of the entry point according to the service location mechanism as defined in RFC ("Request For Comment") document number 2782. A name server compatible with this RFC document will be able to respond to a name resolution request built on this model by giving the address of the entry point.

The third method is the same as the second, but uses the standard domain name "services.dvb.org". In practice, DVB undertakes to maintain at this address information on the services offered by service providers having registered with it.

The fourth method consists in subscribing to a multicast address defined by the IANA ("Internet Assigned Number Authority"), the authority centralizing Internet number assignments. In practice, a multicast address "224.0.23.14" is dedicated to this use and registered for this requirement with this authority.

The fifth method consists, for the client, in offering the facility for the user to manually enter a value for the entry point in the client.

A client conforming to DVB-IPI phase 1 must therefore implement these 5 methods and try them in turn until an entry point is found that enables it to obtain the information describing the services offered to it.

Figure 2:
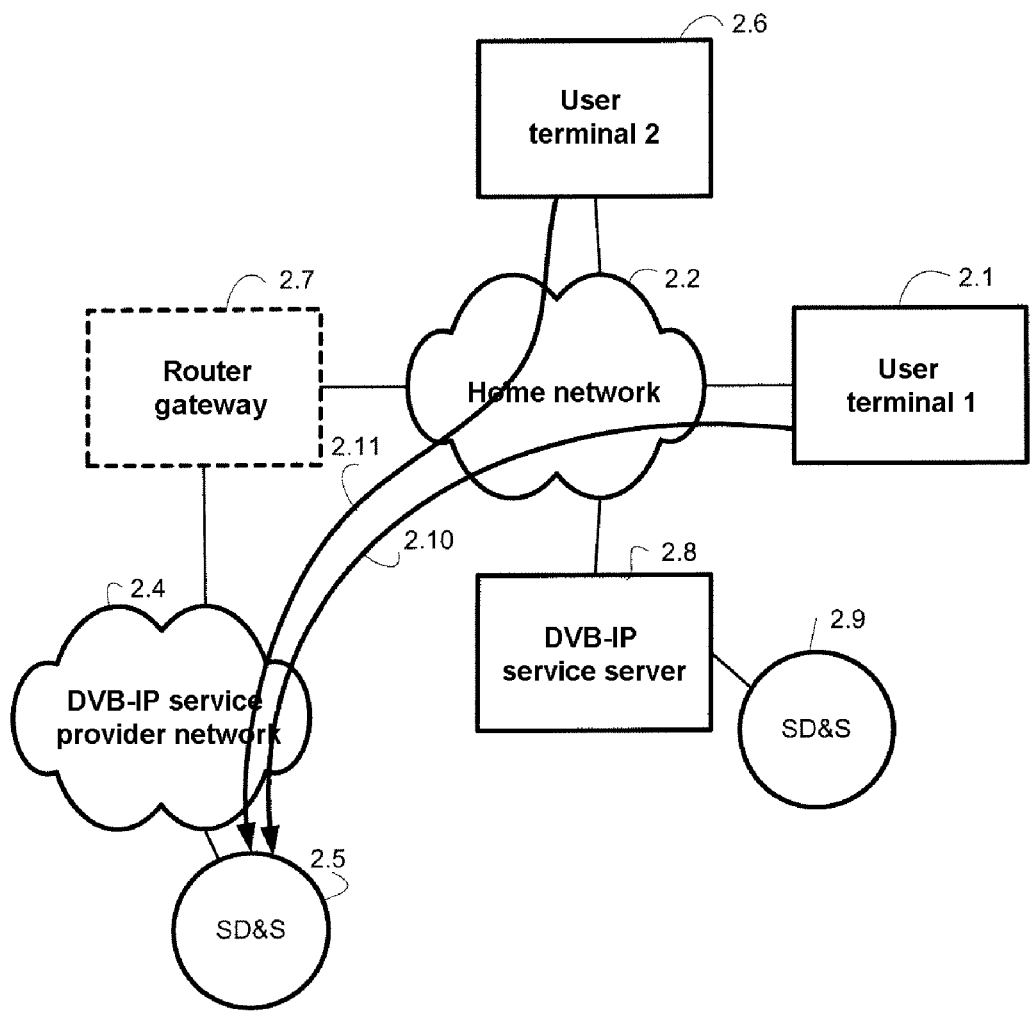
FIG. 2 represents the network architecture that is the context of the invention but without implementation of the latter.

FIG. 2 illustrates the problem that arises on deviating from the strict framework imposed by phase 1 of the standard. The assumption described reflects the diagram illustrated by FIG. 1, but changing the gateway type. In practice, it is commonplace for the home network to form an independent network having its own private addressing space. In this case, the gateway, referenced 2.7, ceases to be transparent to become a genuine router. In this case, it is commonplace for it to implement an address translation technique so as to mask the internal addresses of the home network from the external network, in this case the delivery network. FIG. 2 also illustrates a case in which a number of clients are hosted by the home network, referenced 2.1 and 2.6. The home network can also host local DVB-IPI service servers, referenced 2.8, for which the service descriptions are offered by a local SD&S server, referenced 2.9. Typical of such local DVB-IPI service servers might be a tuner gateway for services transmitted by satellite and redistributing the DVB services received over the IP network, or even a multimedia server storing the services belonging to the user, these services possibly having been registered or bought by the user. The arrows 2.10 and 2.11 represent the entry points of the SD&S service that the clients, conforming to the DVB-IPI phase 1 standard, will obtain in such a configuration, and pointing to the SD&S server of the delivery network.

In practice, the application of the 5 standardized methods for obtaining this entry point applied in the network described must provide the address of the SD&S server 2.5 of the delivery network to the client. This is clear for the methods 2, 3 and 4 described. The method 1 using the network provisioning mechanism defined by the standard requires some explanation. This mechanism relies on the provision by the DHCP server of an address via the "siaddr" field, this address pointing to a server with which the client can dialogue in HTTP mode to obtain additional configuration information, including the entry point or points of the SD&S service or services to which it has access. In the case illustrated in FIG. 1 and used as a basis for the current standard in which, with the gateway being transparent, the DHCP server is hosted and controlled by the delivery network, the service provider managing this delivery network can well be imagined implementing the network provisioning option, but in the case of a home local area network independent of the delivery network, it would not appear reasonable to imagine such a service implemented on the local area network. The client will now obtain its starting configuration from a local DHCP server typically hosted on the gateway, but possibly implemented on any of the devices hosted on the local area network, but therefore managed by the user and not by the service provider. In this context, implementing the optional network provisioning option cannot therefore be included in the hypotheses and the "siaddr" field supplied by the DHCP server of the home network will be zero. The first method implemented by the standard process for searching for the client's SD&S service entry point will therefore always fail.

Since the methods 2 and 3 rely on DNS ("Domain Name Server") name resolution requests, they will be relayed to the name servers of the delivery network and therefore serviced in the same way as if the client were connected directly within the delivery network.

The method 4, relying on listening for a well known multicast address will also function in a comparable manner. In practice, the multicast "crosses" the networks transparently. The client of the local area network will receive any data stream transmitted to this address by the SD&S server of the delivery network.

Since the method 5 relies on the user, the latter, informed by its service provider, will be able, as necessary, to enter the address of this provider's SD&S server.

It can therefore be seen that the client, assuming an independent home local area network, will naturally point to the SD&S service of its service provider. The problem that arises is therefore how it might access any local service servers. In practice, these servers are not known to the service providers, so they are necessarily disregarded by the access provider's SD&S service. The client therefore has no way of accessing them. A solution to this problem is now described to enable a standard client according to the abovementioned DVB-IPI phase 1 standard to access an SD&S service providing it with a full description of the services that are accessible to it both externally via its service provider and internally via local servers on its home local area network.

Figure 3:
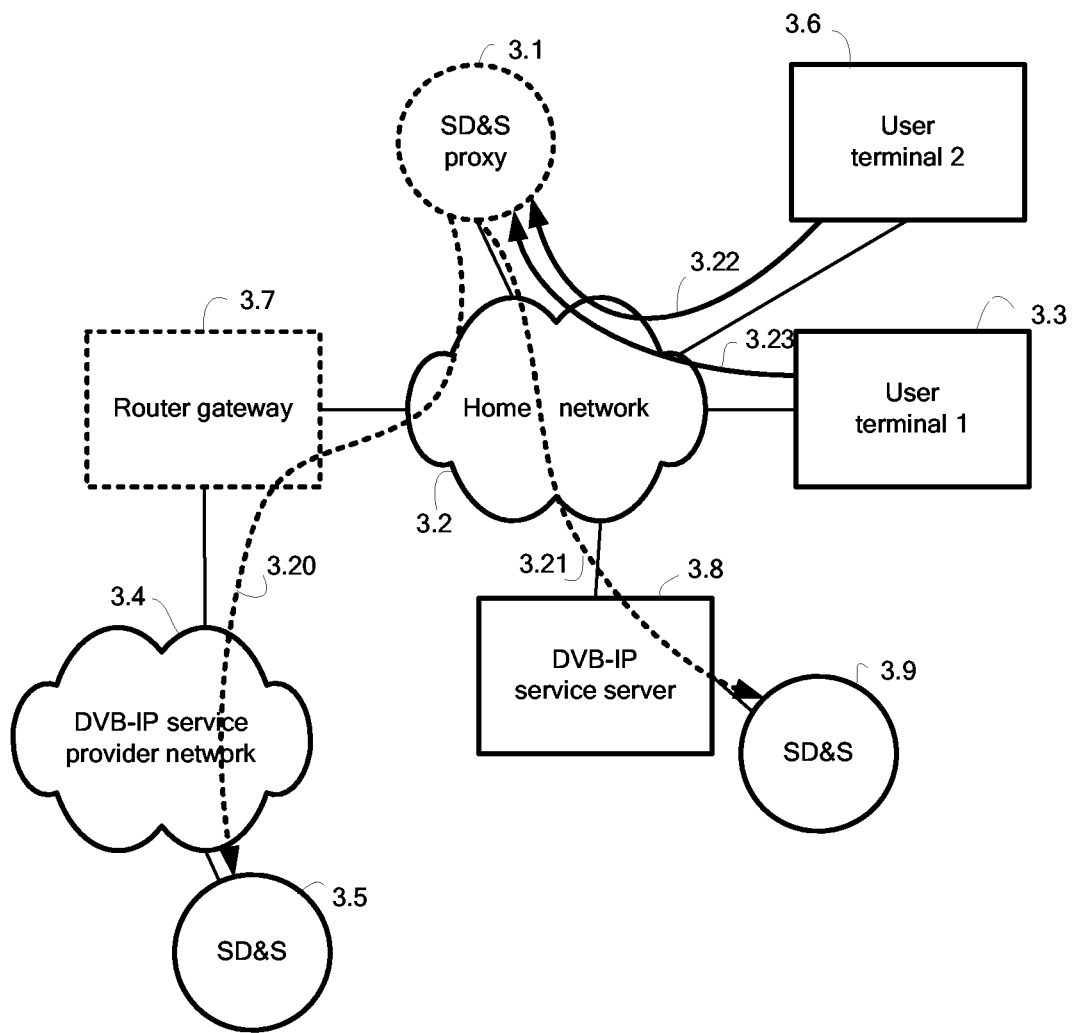
FIG. 3 represents the network architecture and the invention.

FIG. 3 presents a exemplary embodiment of the invention, which defines a local service called SD&S proxy 3.1, which can be hosted on any device of the user's home local area network 3.2 and in particular on the gateway 3.7 linking it to the delivery network. The operation of this SD&S proxy 3.1 relies on a number of functionalities: firstly it has to collect the information on the services available on the home network, this phase being called the internal discovery phase; then it has to collect the information on the services offered by the external delivery network, and this phase is called the external discovery phase. Once the information on all the services, both internal and external, is collected, the SD&S proxy 3.1 offers this information by acting as a standard SD&S server. The home network 3.2 therefore has, in the form of this SD&S proxy 3.1, a local SD&S server containing the information on all the services available for a client (user terminal 3.6 and 3.3) of the local area network. To be complete, the exemplary embodiment of the invention will therefore also describe how to ensure that a standard DVB-IPI client obtains the address of this SD&S proxy 3.1 instead of the address of the SD&S server 3.5 of its delivery network 3.4 during the process for searching for the SD&S service entry point already described. The arrows 3.22 and 3.23 represent the entry points of the user terminals respectively 3.6 and 3.3 to the SD&S proxy 3.1. The arrow 3.20 represents the entry points of the SD&S proxy 3.1 to SD&S server 3.5.

There are many ways of implementing the internal phase for discovering the services available within the home network. Some of these can be described. One smart method, which is the preferred method of the embodiment, is to rely on the UPnP ("Universal Plug and Play") standard which standardizes the interaction and the mutual discovery between devices on an IP-based local area network. A reference to UPnP can be found in the following document: "UPnP™ Device Architecture 1.0". UPnP provides for each device to announce itself to the network by giving information on itself.

In particular, a field defines the type of the device, so it therefore is possible to collect the addresses of all the devices defining themselves as DVB service servers 3.8 or SD&S servers 3.9 on the local area network if these devices satisfy the UPnP standard. Otherwise, it is also possible to provide for the user to manually configure the device hosting the SD&S proxy functionality by entering the addresses of these local devices providing DVB services. Other protocols for discovering the devices available on a local area network are available, each possibly being used here to implement this internal discovery phase without departing from the framework of the invention. The arrow 3.21 represents the entry points of the SD&S proxy 3.1 to SD&S server 3.9.

The external discovery phase therefore consists, for the device hosting the SD&S proxy functionality, in discovering the services offered by the delivery network. It has been seen how this discovery poses no problems to a standard client within the home network. In practice, because of its standardized operation, it will obtain the entry point of the delivery network's SD&S service and is therefore able to interrogate this service to obtain the service information describing the offering available on this delivery network. All that is therefore needed is to provide an operation that is totally standard on this point of the device hosting the SD&S proxy functionality to implement the external discovery phase.

Similarly, since the internal and external discovery phases are defined, the proxy will operate as a totally standard SD&S server with regard to the provisioning of this information on the home local area network. A person skilled in the art shall therefore refer to the document cited to find the detail of the syntax and the organization of the XML files providing this information.

The adaptations needed for a standard client according to the DVB-IPI phase 1 standard to obtain the entry point pointing to the duly defined proxy and not, as we have already seen, the entry point of the delivery network's SD&S server, still have to be described. These adaptations must be made on the gateway separating the home local area network and the delivery network. For each method of the process for obtaining the entry point, the appropriate operation of the exemplary embodiment of the invention will now be detailed.

For the method 1, we have seen that this method will not be implemented on the home local area network. This method will therefore always fail. The client will therefore automatically go on to the method 2.

We have seen that this method 2 consists in launching a DNS request by the name "_dvbservdsc._tcp.domain", in which "domain" is the domain name of the delivery network, the name server of this network responding to this request by giving the address of the SD&S server of said network. The standard client will therefore construct the name as described with the domain name of the home local area network. This domain name will normally be the same as the domain name of the delivery network, but can also be defined locally. In any case, this DNS request must not be treated conventionally and therefore relayed to the delivery network, so the gateway will be configured to block any DNS request for a name beginning with "_dvbservdsc._tcp" or at least the DNS requests "_dvbservdsc._tcp.domain" with "domain" corresponding to the local domain name, the domain name of the delivery network or the domain name "services.dvb.org", and will itself respond by giving the address of the local SD&S proxy. This type of adaptation is normally provided in the gateways that host a local DNS server used to define local associations.

This adaptation will therefore also solve the problem for the method 3 consisting in sending a DNS request to the address "_dvbservdsc._tcp.services.dvb.org".

In the case where the methods 2 and 3 fail, for example in the case where the gateway contains an incorrect address for the SD&S proxy, the client will try the method 4 consisting in listening for the well known multicast address 224.0.23.14. Here, too, an adaptation of the gateway must be made to ensure that the client does not subscribe to the transmission to this address taking place on the delivery network. The subscription to a multicast address is taken out via the IGMP ("Internet Group Management Protocol") protocol which is the protocol used by routers to transmit over a network a request to subscribe to a transmission and to route in return the packets of this transmission from the servers to the client. In particular, a client will send an IGMP request called "join" with the broadcast address for subscribing. It will therefore be sufficient to block this request at the gateway, so the current transmission on the delivery network will not be directed to the home network. However, since the "join" request is broadcast over the local area network, the SD&S proxy will receive it and, like any standard SD&S server, will send its service information to this address. In this way, the local client will therefore receive at the well known multicast address "224.0.23.14", the service information from the SD&S proxy and not from the delivery network.

It can be seen that these adaptations made at the gateway level will also block the SD&S proxy service in its external discovery phase. In practice, the latter is based on applying the standard process for obtaining the entry point of the delivery network's SD&S server. There are a number of ways of solving this problem. A first way to do this is to implement the SD&S proxy on the gateway itself, and in this way, the DNS or IGMP requests issued by the proxy over the gateway will not be blocked by the latter. In the case where the proxy is implemented on a device separate from the gateway within the home local area network, it is possible to configure the gateway so that the requests from the device hosting the proxy are not blocked but treated conventionally.

With regard to the method 5, the user will be able to enter the address of his SD&S proxy in place of that supplied by its service provider.

It can therefore be seen that, at the cost of a DNS configuration and the blocking of the IGMP requests to the well known address, a standard client will now indeed point to the local SD&S proxy and no longer to the SD&S service of the delivery network.

The exemplary embodiment described here is indeed an indicative example and can be adapted by a person skilled in the art. In particular, the adaptations made to the gateway to block DNS or IGMP requests can be implemented differently according to the precise device type used and their characteristics. The exemplary embodiment of the invention, although described for services according to the DVB standard, can be extended to digital services of all types according to other standards and to other networks.

The invention claimed is:

1. Method of discovery of an offering of digital services offered to clients of a local area network, said local area network being connected to a digital service delivery network via a gateway,
   wherein it comprises the following steps, being carried out by a local service discovery and selection proxy hosted on any device of the local area network:
   an internal discovery step of collecting first information on digital services offered by clients of the local area network;
   an external discovery step of collecting second information on digital services offered by the digital service delivery network from a distant service discovery server;

a step for aggregating the collected first and second information collected respectively in the internal and external discovery steps into an aggregated service offering;

a step for providing said aggregated service offering to said clients of the local area network, an address of the local service discovery and selection proxy being obtained by said clients of the local area network through launching of a domain name system (DNS) request specifying the domain name of the local area network, the gateway being configured to respond to said domain name system request by giving the address of the local service discovery and selection proxy, and wherein the gateway is configured to intercept requests including DNS requests from devices in the local area network except from the device hosting the local service discovery and selection proxy and provide the local service discovery and selection proxy address, said local service discovery and selection proxy configured to perform said internal and external discovery steps.

2. The method according to claim 1, wherein the internal discovery step is carried out according to a standard discovery protocol of the devices within the local area network.

3. The method according to claim 2, wherein the standard discovery protocol of the devices within the local area network is Universal Plug and Play (UPnP).

4. The method according to claim 1, wherein the internal discovery step is carried out by manually configuring addresses of clients offering digital services.

5. The method according to claim 1, wherein the external discovery step is carried out according to the Digital Video Broadcasting-Internet Protocol I (DVB-IPI) phase 1 standard.

6. The method according to claim 1, wherein the step for providing said aggregated service offering is carried out according to the DVB-IPI phase 1 standard.

* * * * *